United States Patent
Devireddy et al.

(10) Patent No.: US 11,343,308 B2
(45) Date of Patent: May 24, 2022

(54) REDUCTION OF ADJACENT RACK TRAFFIC IN MULTI-RACK DISTRIBUTED OBJECT STORAGE SYSTEMS

(71) Applicant: Western Digital Technologies, Inc., San Jose, CA (US)

(72) Inventors: Kishore Kumar Reddy Devireddy, San Jose (CA); Ken Williams, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 301 days.

(21) Appl. No.: 16/451,357

(22) Filed: Jun. 25, 2019

(65) Prior Publication Data
US 2020/0412797 A1    Dec. 31, 2020

(51) Int. Cl.
| H04L 29/08 | (2006.01) |
| G06F 16/27 | (2019.01) |
| H04L 67/101 | (2022.01) |
| H04L 67/1097 | (2022.01) |

(52) U.S. Cl.
CPC ........... *H04L 67/101* (2013.01); *G06F 16/27* (2019.01); *H04L 67/1097* (2013.01)

(58) Field of Classification Search
CPC ..... G06F 16/27; G06F 16/134; H04L 67/101; H04L 67/1021; H04L 67/1097; H04L 69/164
See application file for complete search history.

(56) References Cited

U.S. PATENT DOCUMENTS

| 7,877,490 B1 | 1/2011 | Talagala et al. |
| 9,294,558 B1 | 3/2016 | Vincent et al. |
| 9,338,192 B1 | 5/2016 | He et al. |
| 10,346,367 B1 | 7/2019 | Luszcz et al. |

(Continued)

FOREIGN PATENT DOCUMENTS

| CN | 105264865 A | 1/2016 |
| WO | 2007014296 A2 | 2/2007 |
| WO | 2018024344 A1 | 2/2018 |

OTHER PUBLICATIONS

Langley, Adam, et al., The QUIC Transport Protocol: Design and Internet-Scale Deployment, Proceedings of the Conference of the ACM Special Interest Group on Data Communication, Aug. 21-25, 2017. p. 183-196.
Chaizieleftheriou, A. et al., Larry: Practical Network Reconfigurability in the Data Center, 2018, p. 1-16, Microsoft Research, https://www.microsoft.com/en-us/research/uploads/prod/2018/04/nsdi18-Larry.pdf.

(Continued)

*Primary Examiner* — Clayton R Williams
*Assistant Examiner* — Michael Li
(74) *Attorney, Agent, or Firm* — Patent Law Works LLP

(57) ABSTRACT

An example system may include a first rack including a first access node and a second rack including a second access node and a storage node. The first and second racks are included within a multi-rack distributed storage system. The first access node is configured to receive over a connection with a client a first request for an object data. The connection with the client is uniquely identified by a connection ID independent of source and destination addresses and ports. The first access node is further configured to determine object data locality details of the object data and relocate the connection to the second access node in the second rack when the object data locality details of the object data indicate the object data is located within the second rack.

20 Claims, 10 Drawing Sheets

(56) References Cited

U.S. PATENT DOCUMENTS

| | | | |
|---|---|---|---|
| 2007/0022121 A1 | 1/2007 | Bahar et al. | |
| 2009/0059862 A1 | 3/2009 | Talagala et al. | |
| 2012/0072540 A1 | 3/2012 | Matsuzawa | |
| 2012/0236761 A1* | 9/2012 | Yang | H04L 61/103 370/259 |
| 2013/0198250 A1 | 8/2013 | Iwamatsu et al. | |
| 2015/0280959 A1* | 10/2015 | Vincent | G06F 3/0622 709/203 |
| 2017/0171305 A1 | 6/2017 | Jones et al. | |
| 2018/0159717 A1* | 6/2018 | Cormie | G06F 16/134 |
| 2018/0337991 A1 | 11/2018 | Kumar et al. | |
| 2019/0104207 A1 | 4/2019 | Goel et al. | |
| 2019/0138360 A1 | 5/2019 | Devireddy | |
| 2019/0208554 A1 | 7/2019 | Ruiz et al. | |

OTHER PUBLICATIONS

Mahapatra, S. et al., Load Balancing Mechanisms in Data Center Networks, Jan. 2010, p. 1-6, Department of Computer Science, Florida State University, Tallahassee, USA.

Singh, A. et al., Server-Storage Virtualization: Integration and Load Balancing in Data Centers, IEEE Conference on Supercomputing, p. 1-12, Austin, Texas, USA.

Lu, Yilin, et al. "A hybrid dynamic load balancing approach for cloud storage." 2012 International Conference on Industrial Control and Electronics Engineering. IEEE, 2012.

International Search Report and Written Opinion of Application No. PCT/US2020/019770, dated Sep. 7, 2020 (10 pages).

International Search Report and Written Opinion for International Application No. PCT/US2020/019771, dated Jun. 10, 2021, 9 pgs.

\* cited by examiner ial example, to distributed data storage
REDUCTION OF ADJACENT RACK TRAFFIC IN MULTI-RACK DISTRIBUTED OBJECT STORAGE SYSTEMS

TECHNICAL FIELD

The present disclosure generally relates to data storage, and in a more particular example, to distributed data storage systems.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store object data referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may need to interface with a variety of systems, platforms, and applications, some of which may not include native support for object storage. As such, file system interfaces have been developed to enable systems based on alternate storage protocols, such as network file system (NFS) protocol, to benefit from storing data in a back-end large-scale storage system. In addition to object storage systems, other distributed storage systems may use storage paradigms that do not directly map to the file systems of client systems and may utilize some level of metadata and indirection to map between file data and backend storage data.

Large-scale storage systems generally distribute the stored data over multiple storage elements, such as for example solid state drives, or multiple components such as storage nodes comprising a plurality of such storage elements. The distribution of the objects may be across multiple racks in a distributed object storage system. Based on the network topology, shuffling object data between racks during reads (e.g., "GETs") and writes (e.g., "PUTs"), results in undesirable network congestion.

SUMMARY

Various aspects for connection relocation (e.g., migration) in a distributed multi-rack object storage system are described.

system, including: a first rack including a first access node; and a second rack including a second access node and a storage node, the first and second racks included within a multi-rack distributed storage system. The first access node is configured to: receive over a connection with a client a first request for an object data, the connection with the client uniquely identified by a connection ID independent of source and destination addresses and ports; determine object data locality details of the object data; and relocate (e.g., migrate) the connection to the second access node in the second rack responsive to the object data locality details of the object data indicating that the object data is located within the second rack. The first rack may be configured to include metadata including the object data locality details for the object data. The first access node may be further configured to send a second request to a remote access node in a remote rack within the multi-rack distributed storage system, wherein the remote access node includes the metadata including the object data locality details of the object data, and receives the object data locality details of the object data from the remote access node. The remote rack and the second rack may be the same rack within the multi-rack distributed storage system. Alternatively, the remote rack and the second rack may be different racks within the multi-rack distributed storage system.

The relocation (e.g., migration) of the connection may be configured to further include the first access node further configured to send the first request from the client for the object data to the second access node in the second rack. Further, the first access node in relocating the connection may be configured to send the connection ID to the second access node. Also, the second access node for relocating the connection may be further configured to send the connection ID to the client; and send a destination address and destination port of the second access node to the client. Relocating the connection may also include changing a destination Internet Protocol (IP) address associated with the connection from a first IP address of the first access node in the first rack to a second IP address of the second access node in the second rack.

The second access node may be further configured to: send a third request to the storage node in the second rack based on the object data locality details of the object data. The second access node may be further configured to return the object data to the client responsive to the first request being a request to get the object data. The second access node may be yet configured to return a second response to the client responsive to the first request being a request to write the object data to the multi-rack distributed storage system. The connection may be based on a Quick User datagram protocol (UDP) Internet Connection (QUIC) protocol.

receiving over a connection between a client and a first access node in a first rack a first request for an object data, the connection with the client uniquely identified by a connection ID independent of source and destination addresses and ports; determining at the first access node object data locality details of the object data; and relocating the connection to a second access node in a second rack responsive to the object data locality details of the object data indicating the object data is located within the second rack, the first and second racks included within a multi-rack distributed storage system.

the first rack may include metadata including the object data locality details for the object data. Determining the object data locality details may further include sending a second request to a remote access node in a remote rack within the multi-rack distributed storage system, the remote access node including the metadata including the object data locality details of the object data; and receiving the object data locality details of the object data from the remote access node. Relocating the connection may further include sending the first request from the client for the object data to the second access node in the second rack. The computer-implemented method may further include sending a third request to the storage node in the second rack based on the object data locality details of the object data. The connection may be based on a Quick UDP Internet Connection (QUIC) protocol.

means for receiving over a connection between a client and a first access node in a first rack a first request for an object data, the connection with the client uniquely identified by a connection ID independent of source and destination addresses and ports; means for determining at the first access node object data locality details of the object data; and means for relocating the connection to a second access node in a second rack responsive to the object data locality details of the object data indicating the object data is located within the second rack, the first and second racks included within a multi-rack distributed storage system. The various embodiments advantageously apply the teachings of distributed storage networks and/or systems to reduce the inter-rack transfer of object data in response to a client request. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the relocation (e.g., migration) of connections that include client requests for writing or reading object data in a multi-rack distributed object storage system.

Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
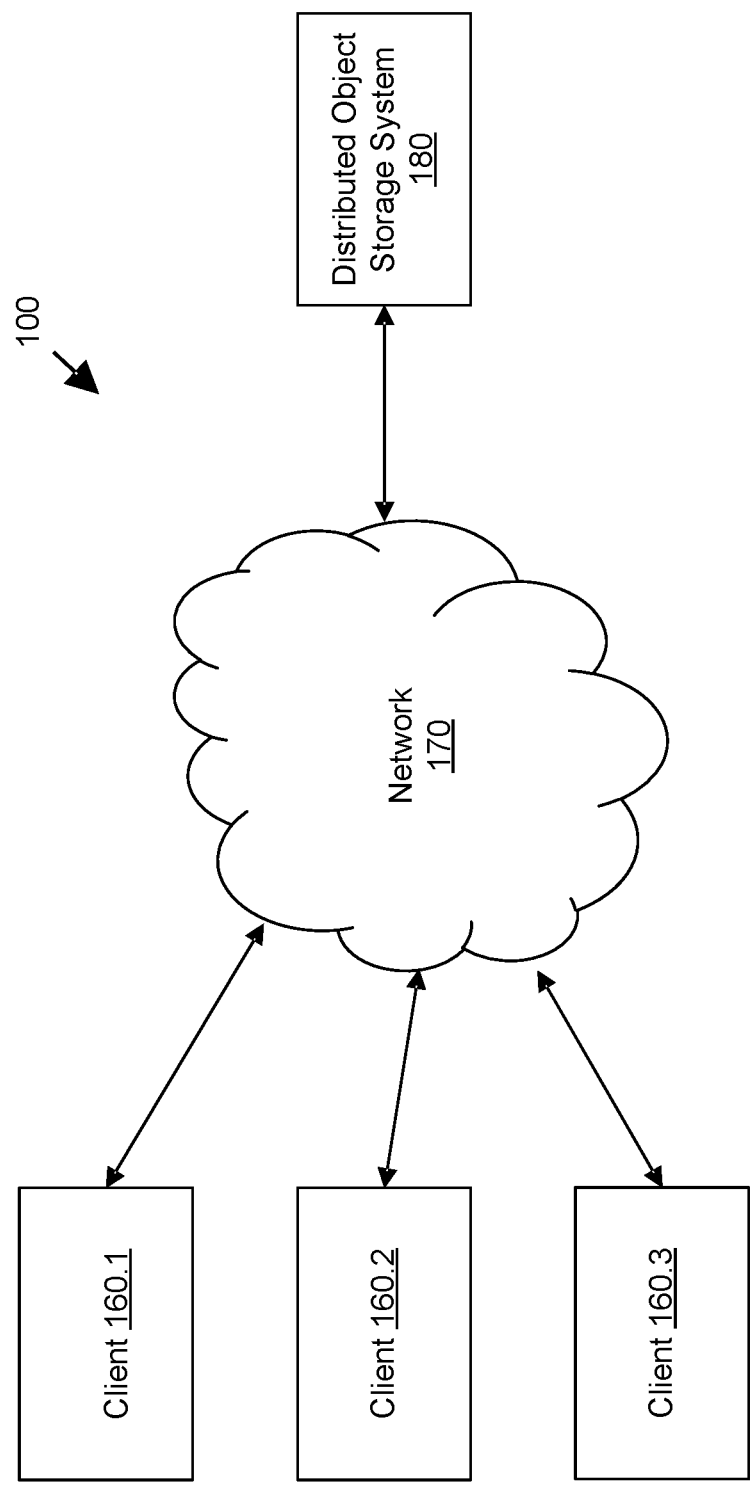
FIG. 1 is a block diagram of an example storage network using a client architecture.

FIG. 1 is a block diagram of an example storage network 100 using a client architecture. In some embodiments, the storage network 100 includes a multi-rack object storage system 180 and may include multiple client devices 160 capable of being coupled to and in communication with a storage network 100 via a wired and/or a wireless network 170 (e.g., public and/or private computer networks in any number and/or configuration (e.g., the Internet, an intranet, a cloud network, etc.)), among other examples that may include one client device 160.1 or two or more client devices 160 (e.g., is not limited to three client devices 160.1-160.3).

A client device 160 can be any computing hardware and/or software (e.g., a thick client, a thin client, or hybrid thereof) capable of accessing the distributed object storage system 180 utilizing network 170. Each client device 160, as part of its respective operation, relies on sending input/output (I/O) requests to the multi-rack object storage system 180 to write data, read data, and/or modify data. Specifically, each client device 160 can transmit I/O requests to read, write, store, communicate, propagate, and/or transport instructions, data, computer programs, software, code, routines, etc., to the multi-rack object storage system 180. Client device(s) 160 and storage system 180 may comprise at least a portion of a client-server model. In general, the multi-rack object storage system 180 may be accessed by client device(s) 160 and/or communication with the multi-rack object storage system 180 may be initiated by client device(s) 160 through a network socket (not shown) utilizing one or more inter-process networking techniques. In some embodiments, client devices 160 may access one or more applications to use or manage a distributed storage system, such as distributed storage object system 180.

Figure 2:
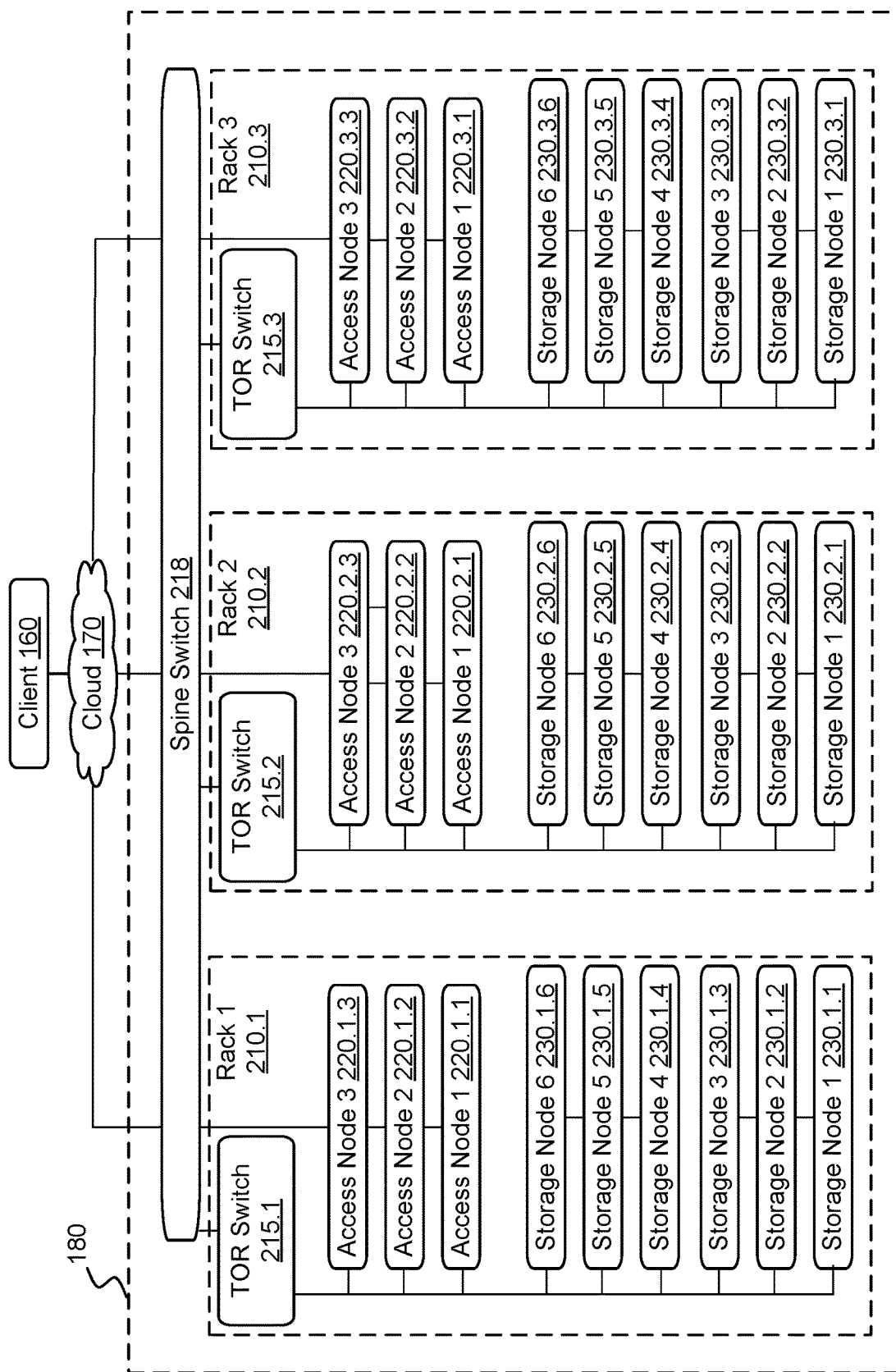
FIG. 2 shows an embodiment of an example multi-rack object storage system.

FIG. 2 shows an embodiment of an example multi-rack object storage system 180. According to this embodiment the multi-rack object storage system 180 may be implemented as a distributed object storage system which is coupled to one or more clients 160 for accessing object data. The connection between the multi-rack object storage system 180 and clients 160 could, for example, be implemented as a suitable data communication network 170. Clients 160 may host or interface with one or more applications that use data stored in multi-rack object storage system 180. Such an application could, for example, be a dedicated software application running on a client computing device, such as a personal computer, a laptop, a wireless telephone, a personal digital assistant, or any other type of communication device that is able to interface directly with the multi-rack object storage system 180. However, according to alternative embodiments, the applications could, for example, comprise a suitable file system which enables a general-purpose software application to interface with the multi-rack object storage system 180, an application programming interface (API) library for the multi-rack object storage system 180, etc.

Clients 160 may include computing devices and/or systems running applications compatible with one or more file systems that manage data and data access through files, directories, volumes, devices, and/or similar logical structures for mapping data units to physical storage locations. For example, clients 160 may include file system clients configured with a file system protocol, such as the network file system (NFS) protocols, server message block (SMB) protocols, file allocation table (FAT) protocols, Hadoop distributed file system (HDFS) protocols, Google file system (GFS) protocols, etc.

As further shown in FIG. 2, the multi-rack object storage system 180 may be configured as a multi-rack distributed object storage system including a plurality of racks 210. The multi-rack configuration illustrated in FIG. 2 includes a first rack 210.1, a second rack 210.2, and a third rack 210.3. The quantity of racks in FIG. 2 is illustrative and is not to be considered limiting of any configuration of the multi-rack object storage system 180. The each of the plurality of racks 210 may include one or more top-of-rack (TOR) switches 215, each of which couple to a spine switch 218 in the multi-rack object storage system 180. The spine switch 218 provides an interface for the multi-rack object storage system 180 with the network 170.

Each of the racks 210 comprises a plurality of access node 220.x.1-220.x.n and a plurality of storage nodes 230.x.1-230.x.m (where "x" is the rack number) which may be coupled in a suitable way for transferring data, for example via a suitable data communication network such as a local area network (LAN), a wide area network (WAN), a telephone network, such as the public switched telephone network (PSTN), an intranet, the internet, or any other suitable communication network or combination of communication networks. By way of example and not limitation, each rack 210 in FIG. 2 illustrates three access nodes (220.x.1-220.x.3) and six storage nodes (230.x.1-230.x.6).

Access nodes 220, storage nodes 230 and the computing devices comprising clients 160 may connect to the data communication network 170 by means of suitable wired, wireless, optical, etc. network connections or any suitable combination of such network connections. Although the embodiment of FIG. 2 shows only nine access nodes 220 and eighteen storage nodes 230, according to alternative embodiments the multi-rack object storage system 180 could comprise any other suitable number of storage nodes 230 and access nodes 220.

Access nodes 220 and storage nodes 230 may be built as general-purpose computers, however more frequently they are physically adapted for arrangement in large data centers, where they are arranged in modular racks 210.1-210.n comprising standard dimensions. Exemplary access nodes 220 and storage nodes 230 may be dimensioned to take up a single unit of such racks 210, which may be generally referred to as 1U. Such an exemplary storage node may use a low-power processor and may be equipped with ten or twelve high capacity serial advanced technology attachment (SATA) disk drives and is connectable to the network over redundant Ethernet network interfaces.

An exemplary access node 220 may comprise high-performance servers and provide network access to clients 160 over multiple high bandwidth Ethernet network interfaces. Data can be transferred between clients 160 and such access nodes 220 by means of a variety of network protocols including hypertext transfer protocol (HTTP)/representational state transfer (REST) object interfaces, HTTP/2, language-specific interfaces such as Microsoft .Net, Python or C, etc. Additionally, such access nodes may comprise additional high bandwidth Ethernet ports to interface with the storage nodes 230. In some embodiments, HTTP/REST protocols complying with S3 may enable data transfer through a REST application protocol interfaces (API). Such access nodes 220 may operate as a highly available cluster of controller nodes with one or more integrated and/or independent interface systems, and provide for example shared access to the storage nodes 230, metadata caching, protection of metadata, etc.

As shown in FIG. 2 several storage nodes 230 can be grouped together, for example because they are housed in a single rack 210. For example, storage nodes 230.1.1-230.1.6, 230.2.1-230.2.6, and 230.3.1-230.3.6 are respectively grouped into racks 210.1, 210.2, and 210.3. Access nodes 220 may be located in the same or different racks as the storage nodes to which the access nodes connect.

Figure 3:
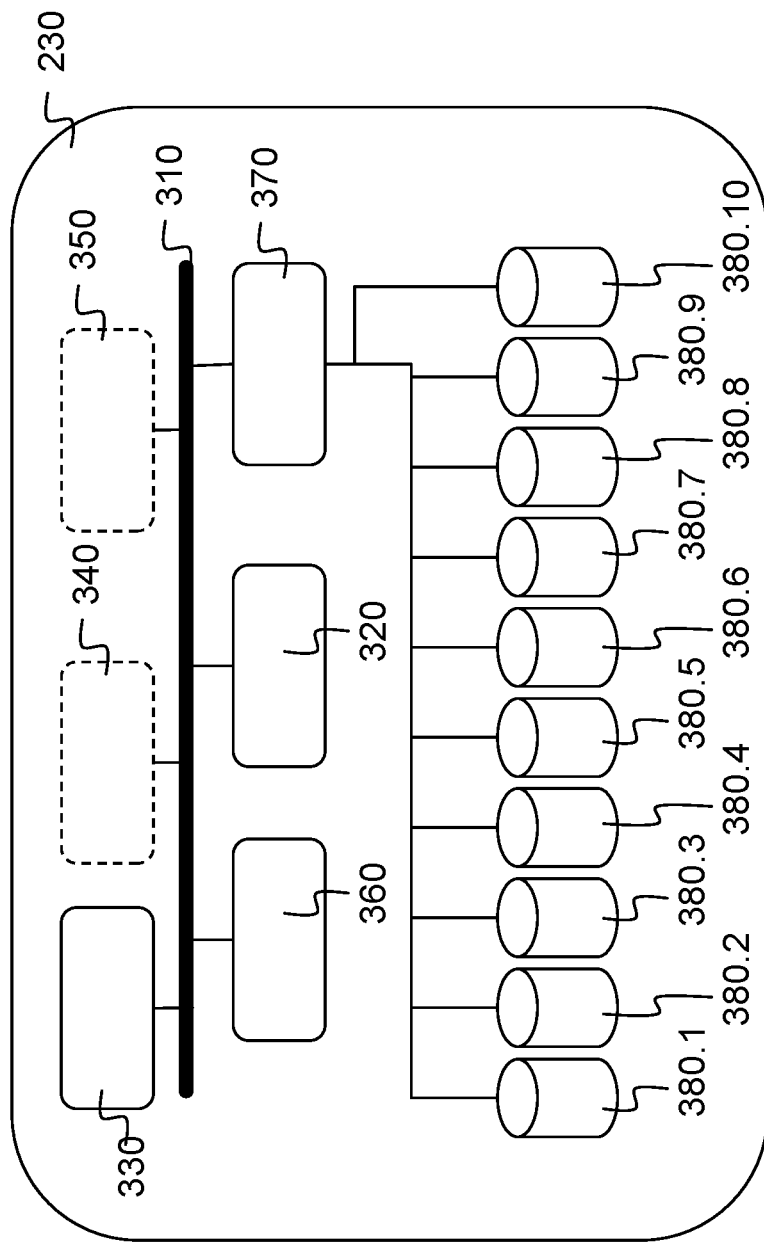
FIG. 3 shows a schematic representation of an embodiment of one of the storage nodes.

FIG. 3 shows a schematic representation of an embodiment of one of the storage nodes 230. Storage node 230 may comprise a bus 310, a processor 320, a local memory 330, one or more optional input units 340, one or more optional output units 350, a communication interface 360, a storage element interface 370, and two or more storage elements 380.1-380.10. Bus 310 may include one or more conductors that permit communication among the components of storage node 230.

Processor 320 may include any type of suitable processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320.

Input unit 340 may include one or more suitable mechanisms that permit an operator to input information to the storage node 230, such as a keyboard, a mouse, a pen, voice recognition and/or biometric mechanisms, etc. Output unit 350 may include one or more suitable mechanisms that output information to the operator, such as a display, a printer, a speaker, etc. Communication interface 360 may include any transceiver-like mechanism that enables storage node 230 to communicate with other devices and/or systems, for example mechanisms for communicating with other storage nodes 230 or access nodes 220 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 1, such a storage node 230 could comprise ten or twelve 3 TB SATA disk drives as storage elements 380.1-380.10 and in this way storage node 230 would provide a storage capacity of 30 TB or 36 TB to the multi-rack object storage system 180. According to the exemplary embodiment of FIG. 2 and in the event that the various storage nodes 230 are identical and each comprise, for example, a storage capacity of 36 TB, the multi-rack object storage system 180 would then have a total storage capacity of 1440 TB.

As is clear from FIGS. 2 and 3, the distributed object storage system 180 comprises a plurality of storage elements 380. As will be described in further detail below, the storage elements 380, could also be referred to as redundant storage elements 380 as the data is stored on these storage elements 380 such that none or a specific portion of the individual storage elements 380 on its own is critical for the functioning of the distributed storage system. Each of the storage nodes 230 may comprise a share of these storage elements 380.

As will be explained in further detail below, the multi-rack object storage system 180 may be operable as a distributed object storage system to store and retrieve an object data comprising data (e.g. 64 megabytes (MB) of binary data), and object data locality details of the object data, such as an object data identifier for addressing the object data, for example, a universally unique identifier such as a globally unique identifier (GUID). Embodiments of the multi-rack object storage system 180 may operate as a distributed object storage system. Storing the data offered for storage by the application in the form of object data, also referred to as object storage, may have specific advantages over other storage schemes such as suitable block-based storage or suitable file-based storage.

The storage elements 380 or a portion thereof may be redundant and operate independently of one another. This means that if one particular storage element 380 fails its function it can easily be taken on by another storage element 380 in the multi-rack object storage system 180. However, as will be explained in more detail further below, the storage elements 380 are capable of providing redundancy without having to work in synchronism, as is for example the case in many available redundant array of independent disks (RAID) configurations, which sometimes even require disc spindle rotation to be synchronized. Furthermore, the independent and redundant operation of the storage elements 380 may allow a suitable mix of types of storage elements 380 to be used in a particular multi-rack object storage system 180. It is possible to use for example storage elements 380 with differing storage capacity, storage elements 380 of differing manufacturers, using different hardware technology such as for example suitable hard disks and solid state storage elements, using different storage interfaces such as for example different revisions of SATA, parallel advanced technology attachment (PATA), and so on. This may result in advantages relating to scalability and flexibility of the multi-rack object storage system 180 as it allows for adding or removing storage elements 380 without imposing specific requirements to their design in correlation to other storage elements 380 already in use in the distributed object storage system.

Figure 4:
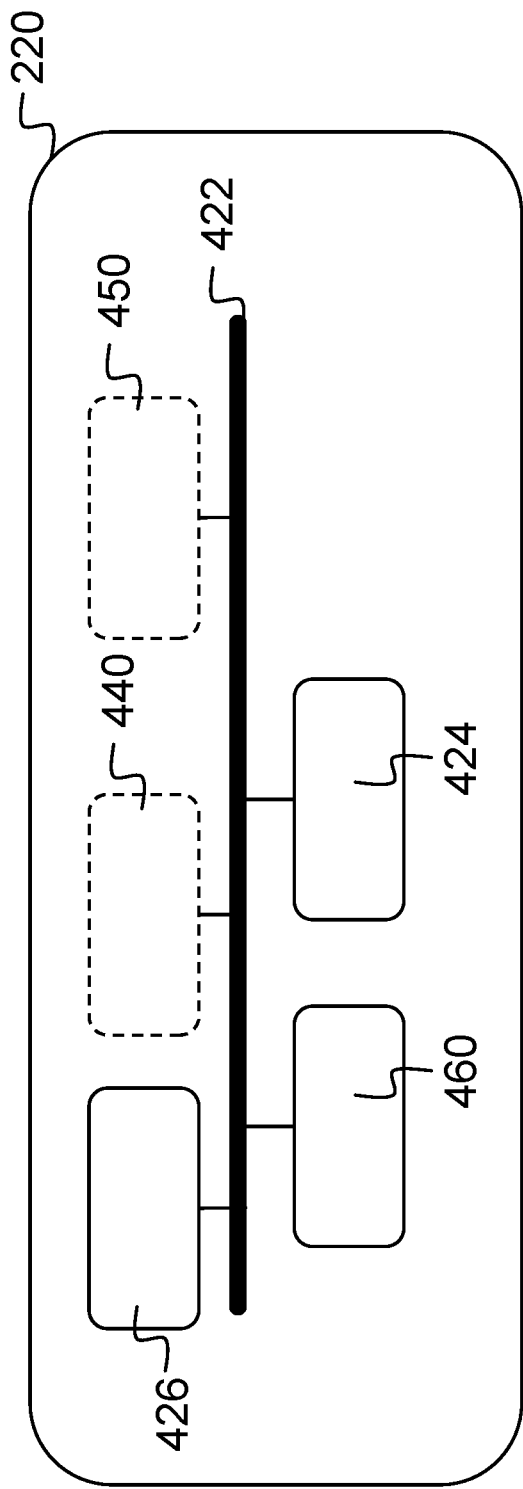
FIG. 4 shows a schematic representation of an embodiment of the access node.

FIG. 4 shows a schematic representation of an embodiment of the access node 220. Access node 220 may include controller node functions and/or file system interface functions for client systems using file system protocols to access data stored in object data in storage nodes 230. Access node 220 may comprise a bus 422, a processor 424, a local memory 426, one or more optional input units 440, one or more optional output units 450. Bus 422 may include one or more conductors that permit communication among the components of access node 220. Processor 424 may include any type of suitable processor or microprocessor that interprets and executes instructions. Local memory 426 may include a random access memory (RAM) or another type of dynamic storage device that stores information and instructions for execution by processor 424 and/or a read only memory (ROM) or another type of static storage device that stores static information and instructions for use by processor 424 and/or any suitable storage element such as a hard disc or a solid state storage element.

An optional input unit 440 may include one or more suitable mechanisms that permit an operator to input information to the access node 220 such as a keyboard, a mouse, a pen, voice recognition and/or biometric mechanisms, etc. Optional output unit 450 may include one or more suitable mechanisms that output information to the operator, such as a display, a printer, a speaker, etc. Communication interface 460 may include any transceiver-like mechanism that enables access node 220 to communicate with other devices and/or systems, for example mechanisms for communicating with other storage nodes 230 or access nodes 220 such as for example two 10 Gb Ethernet interfaces.

According to an alternative embodiment, the access node 220 could have an identical design as a storage node 230, or according to still a further alternative embodiment one of the storage nodes 230 of the distributed object storage system could perform both the function of an access node 220 and a storage node 230. According to still further embodiments, the components of the access node 220 as described in more detail below could be distributed amongst a plurality of access nodes 220 and/or storage nodes 230 in any suitable way. According to still a further embodiment, the clients 160 may run an access node 220. According to still further embodiments, access node 220 may be embodied in separate controller nodes and interface nodes with or without redundancy among the controller nodes and/or interface nodes.

Figure 5:
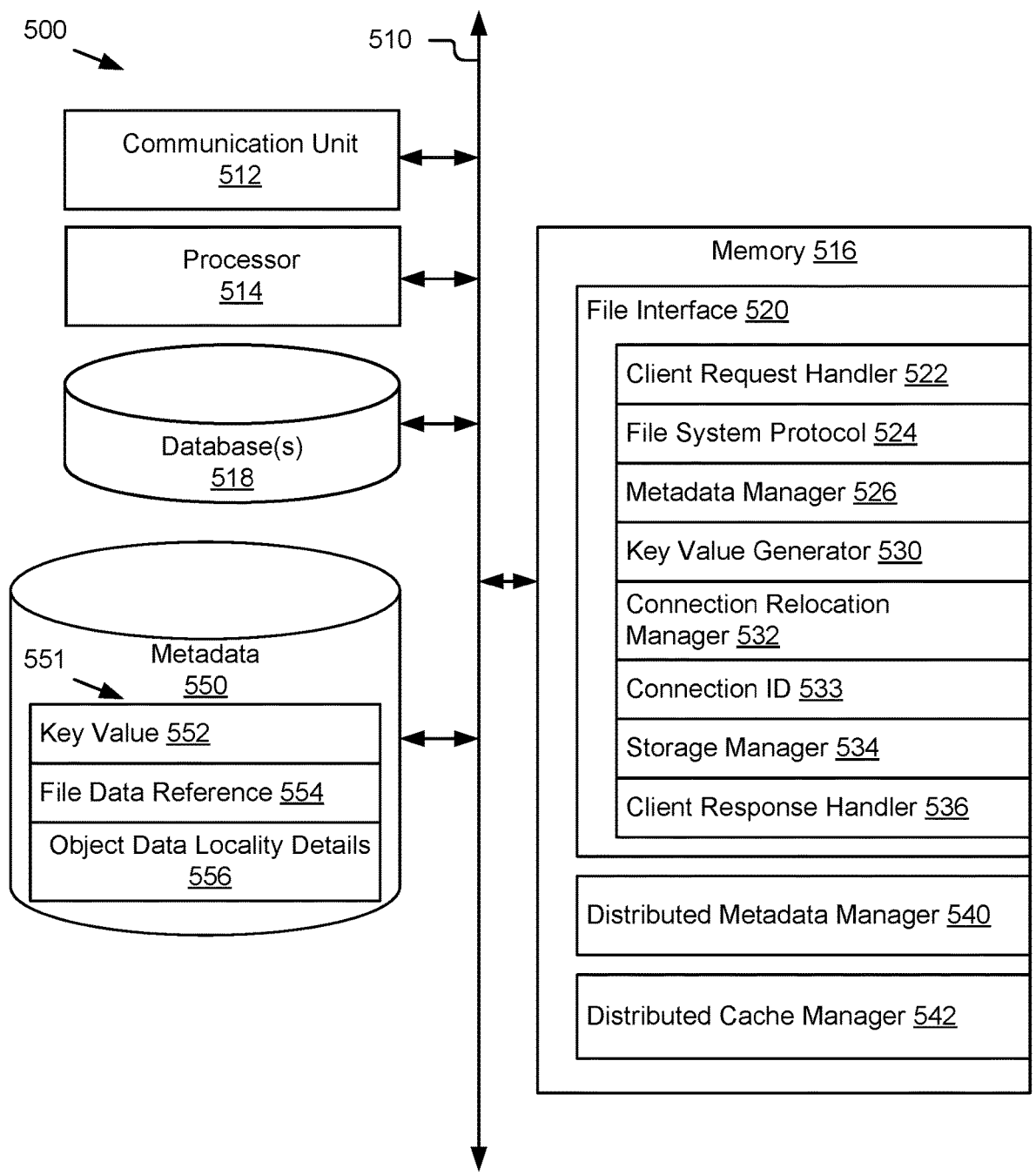
FIG. 5 schematically shows selected modules of an access node with file system interface functions.

FIG. 5 schematically shows selected modules of an access node with file system interface functions. Access node 500 may be configured as a node with an architecture and/or hardware similar to access nodes 220 and/or storage nodes 230. Access node 500 may incorporate elements and configurations similar to those shown in FIGS. 1-4. For example, access node 500 may show selected modules for handling file data requests using a file system protocol.

Access node 500 may include a bus 510 interconnecting at least one communication unit 512, at least one processor 514, and at least one memory 516. Bus 510 may include one or more conductors that permit communication among the components of access node 500. Communication unit 512 may include any transceiver-like mechanism that enables access node 500 to communicate with other devices and/or systems. For example, communication unit 512 may include wired or wireless mechanisms for communicating with file system clients, other access systems, and/or one or more object storage systems or components, such as storage nodes or controller nodes.

Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Access node 500 may include or have access to one or more databases 518 and specialized data stores, such as metadata store 550. Databases 518 may include one or more data structures for storing, retrieving, indexing, searching, filtering, etc. of structured and/or unstructured data elements. Metadata store 550, and/or other databases 518 may be maintained and managed in separate computing systems with separate communication, processor, memory, and other computing resources and accessed by access node 500 through database access protocols, such as structured query language (SQL). Metadata store 550 may be structured as key-value stores and may be shared across multiple access nodes 500.

Access node 500 may include a plurality of modules or subsystems that are stored and/or instantiated in memory 516 for execution by processor 514. For example, memory 516 may include a file interface module 520 configured to receive, process, and respond to file data requests from file system clients using file system protocols. File interface module 520 may be configured to receive file data requests and process the received file data requests to generate one or more storage data requests for processing by an associated distributed storage system, such as object data requests for an object storage system. File interface module 520 may communicate with metadata store 550 to store and retrieve data element cross-reference metadata to map the file system files of the requesting client to the storage data elements and/or locations of the distributed storage system.

File interface module 520 may include a client request handler 522, a file system protocol 524, a metadata manager 526, a key value generator 530, a connection relocation manager 532, a connection ID 533, a storage manager 534, and a client response handler 536. File interface module 520 may include additional modules (not shown) for other data access features, such as data caching, request prioritization, etc.

Client request handler 522 may include an interface and/or communication event-based condition for receiving file data requests from one or more file system clients. For example, client systems may send a file data request over a network connection and addressed to access node 500 or a port or component thereof. Client request handler 522 may receive these requests and parse them according to the appropriate communication and file system protocol (such as defined in file system protocol 524). For example, client request handler 522 may identify a transaction identifier, a client identifier, a file identifier, a data operation, and additional parameters for the data operation, if any, from the received message or messages that make up the file data request.

File system protocol 524 may include configuration settings, functions, modules, application protocol interfaces (APIs), extensions, or other elements to support a selected file system protocol. For example, file interface 520 may be configured to support a specific set of client systems that use a selected file system protocol, such as NFS, SMB, FAT, HDFS, GFS, etc. protocol. File interface 520 may support a single file system protocol or select a protocol from a set of available protocols. In some embodiments, the other modules of file interface 520 may utilize the configuration settings or other functions of file system protocol 524 to support receiving, parsing, processing, and responding to file data requests in the selected file system protocol.

Metadata manager 526 may include an interface protocol or set of functions and parameters for storing, reading, and otherwise managing metadata, including object data locality details of the object data and other data related to data files and storage data elements. For example, metadata manager 526 may include functions for storing, searching, and reading data file to storage element mapping information to and from metadata store 550. Metadata store 550 may be configured as a key-value store. For example, each data file may have at least one corresponding entry in metadata store 550 with a unique key value 552 and a cross-reference of file data references or identifiers to storage data references or identifiers.

Each key value 552 may index a number of corresponding fields, such as file data reference 554 and object data locality details 556. File data reference 554 may provide a file data identifier, such as node and file name, and/or parameters for generating a file data identifier corresponding to a client data file identified in a file data request in accordance with file system protocol 524. File data reference 554 may include additional file data related metadata used for managing file data requests.

Object data locality details 556 may provide an object data identifier, such as a global unique identifier (GUID), and/or parameters for generating an object data identifier corresponding to client data stored in object data in an associated object storage system and corresponding to the client data file associated with the key entry. Other storage data references may include logical and/or physical mapping for the distributed storage system, such as logical block addresses, file identifiers for a different file-based storage system, etc. In some embodiments, key value 552 may be derived from file data reference 554 and/or object data locality details 556.

The metadata manager 526 may also utilize a key value generator 530 for new mapping entries in metadata store 550 and, in some embodiments, key value generator 530 may be configured to generate both mapping entry key values and request entry key values, among others. Key value generator 530 may include logic for generating key values that improve indexing and/or reduce the number of fields to represent request entries. Key value generator 530 may parse the file data request or receive fields or parameters parsed by client request handler 522 for use in generating key value 552. For example, client reference parameters, transaction identifiers, transaction types or parameters, and/or file data references may contribute to the generation of a unique key value 552 for a particular file data request.

In some embodiments, a connection relocation manager 532 reduces the inter-rack (east-west) traffic in a multi-rack distributed object storage system by relocating the connection end point. In a multi-rack distributed object storage system, object data may exist on any rack and client requests may be placed to any rack. The communication between the racks, which may also be known as "east-west traffic," becomes unavoidable. Connection relocation manager 532 relocates the client request connection end point to the rack where object data is located. Client request may utilize a hypertext transfer protocol/transmission control protocol (HTTP/TCP) connection, which is not easy to relocate to a different server. In some embodiments, a connection-oriented protocol is used which is designed with connection end point relocation capability.

In some embodiments, the connection-oriented protocol may include a protocol where connections are identified using, for example, a 64-bit connection ID. If the client's or server's IP address changes in connection-oriented protocol, the connection may be maintained by using the old connection ID used at the new IP address without necessitating any requests. One example of the connection-oriented protocol includes the QUIC protocol established by Google, Inc.™ QUIC protocol is a multiplexed and secure transport layer built atop UDP, and is designed and optimized for HTTP/2 semantics. QUIC provides multiplexing and flow control equivalent to HTTP/2, security equivalent to transport layer security (TLS), and connection semantics, reliability, and congestion control equivalent to TCP. While TCP connections are identified by a 4 tuple of source address, destination address and its ports, which mean that if a client's or server's IP address changes, any active TCP connections are no longer valid, QUIC connections are identified using, for example, a 64-bit connection ID 533. If the client's or server's IP address changes in QUIC connection, it can continue to use the old connection ID from the new IP address without any requests.

Storage manager 534 may include an interface protocol or set of functions and parameters for storing, reading, and otherwise managing data requests to an associated distributed storage system. For example, storage manager 534 may include functions for reading, writing, modifying, or otherwise manipulating object data and their respective client data and metadata in accordance with the protocols of an object storage system. Storage manager 534 may generate data requests translated and mapped from file data references to storage data references using metadata store 550. File interface 520 may include additional logic and other resources (not shown) for processing file data requests, such as modules for generating, caching, queueing, and otherwise managing data requests. Processing of a file data request by file interface 520 may include any number of intermediate steps that yield at least one data request to the distributed storage system from storage manager 534, such as an object data request to an object storage system.

Client response handler 536 may include an interface and/or communication logic for sending response messages, such as result, status, or error messages, to one or more file system clients related to file data requests received. For example, client response handler 536 may wait for processing to complete or generate an error and provide an appropriate result or error message to the client system(s) for each file data request received.

Distributed metadata manager 540 and distributed cache manager 542 may be included in access node 500 when metadata store 550 is distributed data stores that are distributed across multiple access systems or other computing systems. Metadata store 550 may be sharded data stores, wherein the data stores are partitioned into segments stored in different computing systems. Distributed metadata manager 540 and distributed cache manager 542 may include the functions for locating and accessing relevant portions of the sharded data base, such as to support metadata manager 526, key value generator 530, and storage manager 534.

Figure 6:
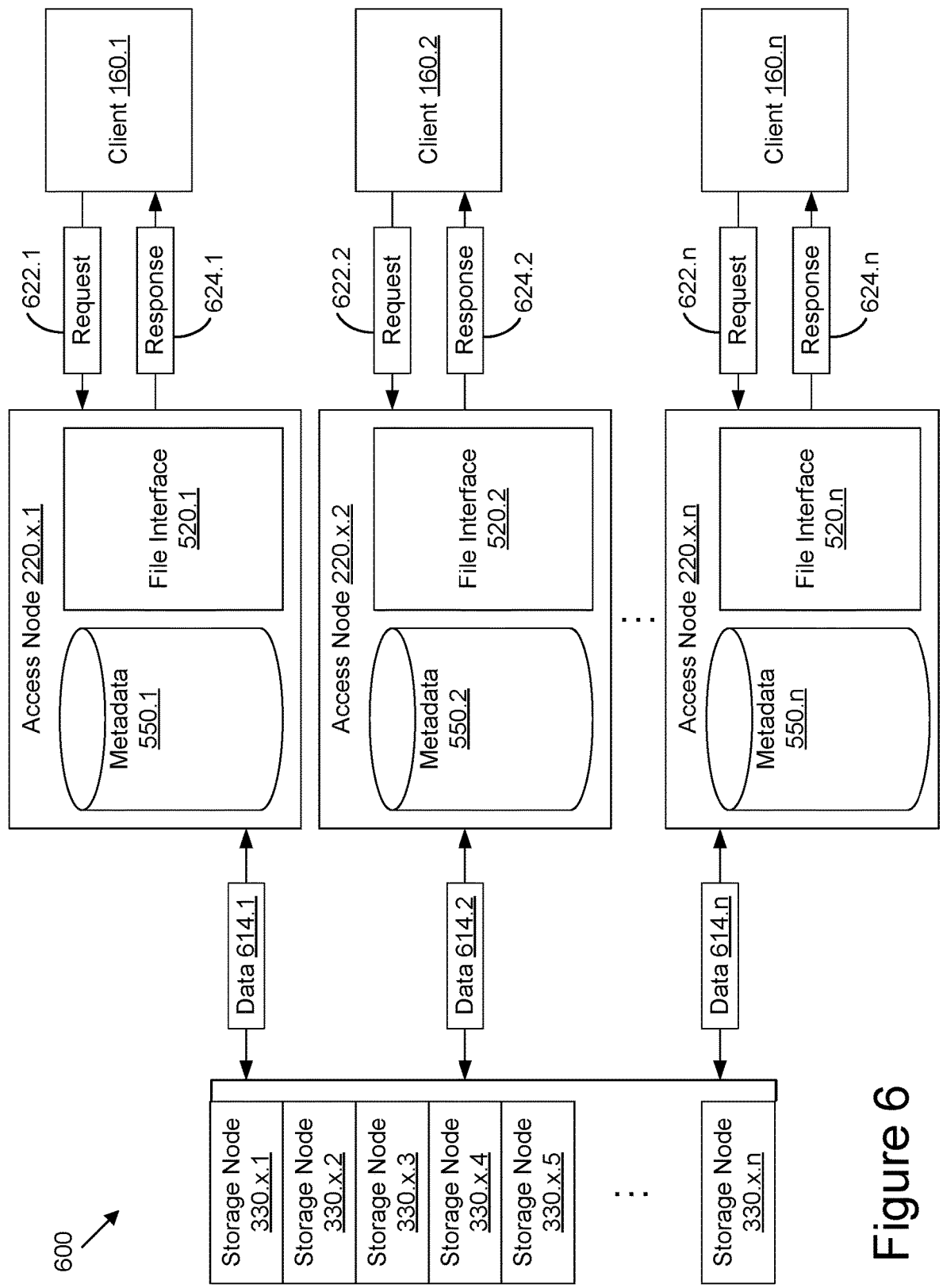
FIG. 6 shows a distributed object data storage system capable of connection relocation (e.g., migration).

FIG. 6 shows a distributed object data storage system 600 capable of connection relocation (e.g., migration), as further described below. In some embodiments, distributed object data storage system 600 may be configured according to the systems and elements described with regard to FIGS. 1-5. Distributed object data storage system 600 may include a plurality of storage nodes 330.*x*.1-330.*x*.*n* for receiving and processing storage data requests 614.1-614.*n*. A plurality of access nodes 220.*x*.1-220.*x*.*n* may receive file data requests 622.1-622.*n* from and provide responses 624.1-624.*n* to clients 160.1-160.*n*.

Clients 160 may include computing systems using file system protocols to access and store file data. For example, individual computing systems, application servers, legacy enterprise network systems, and other systems may be configured with NFS protocols for data storage and retrieval. Clients 160 may host or interface with one or more applications that generate file data requests 622, such as read, write, create, delete, move, etc. requests or commands for manipulating data files through data operations. File data requests 622 may include a transaction identifier, a client identifier, a file data identifier, a data operation, and additional parameters for the data operation, if any. Clients 160 may expect to receive responses 624 corresponding to requests 622.

Access nodes 220 may include file interfaces 520.1-520.*n*, and metadata stores 550.1-550.*n*. File interfaces 520 may include file interface systems and modules for receiving requests 622, checking for object data locality, generating object data requests 614 to storage nodes 610 for requests using metadata stores 550 responsive to the object data being local and sending a request to and receiving a response from a remote rack where the metadata for the requested object data is located, and generating responses 624 to clients 160. The file interface 520 may be further configured to contact an access node in the remote rack to inform the remote rack of a forthcoming connection relocation (e.g., migration). The file interface 520 may be further configured to send the connection identifier (ID) along with connection details to the remote system node for relocating the connection end point. When the access node 220 is the remote rack, the file interface 520 is further configured to handshake with the client 160 with the connection ID along with the revised (e.g., remote) destination details.

While access node 220 and file system clients 220 are shown in a one-to-one correlation with communication from, for example, client 160.1 to access node 220.*x*.1, alternate configurations may include different numbers and communication paths with regard to access systems and client systems. For example, a single access system may handle file data requests from a plurality of file system clients or a single file system client may send different file data requests to a plurality of access systems.

In some configurations, a plurality of access nodes 220 are configured with a plurality of clients 160 such that file data requests may be sent from and handled by any system for redundancy and/or requests may be dynamically load balanced across the available access systems and/or file system clients. In some embodiments, these configurations may include failover and retry of transactions across multiple clients 160 and/or access nodes 220. Access nodes 220 may be configured such that metadata stores 550 are distributed and/or accessible through remote queries from file interfaces 520 of other access systems to allow connection relocation (e.g., migration) from one access node to a remote access node regardless of client.

Figure 7:
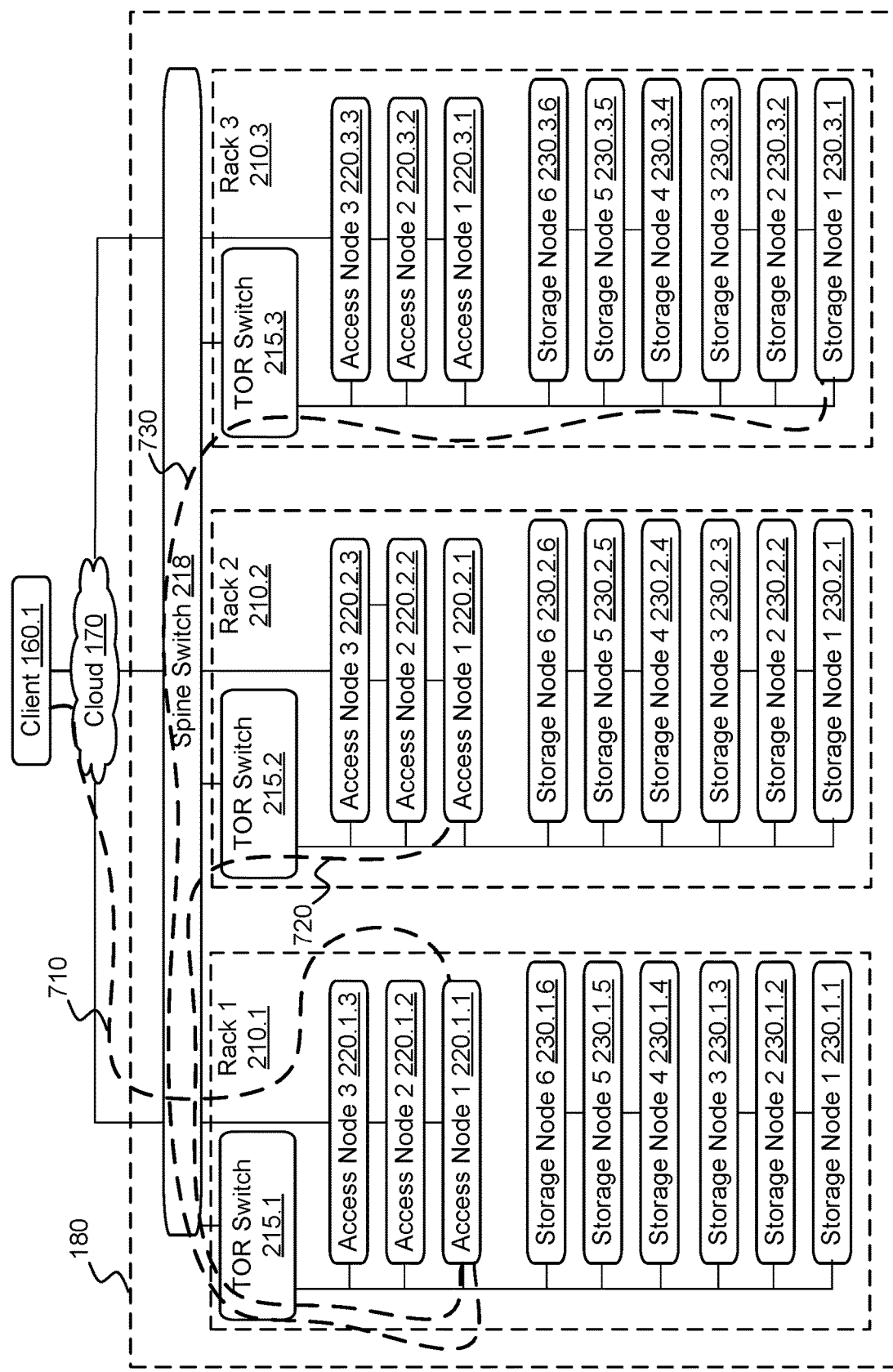
FIG. 7 illustrates a flow diagram of a client request to a multi-rack distributed object storage system.

FIG. 7 illustrates a flow diagram of a client request to a multi-rack distributed object storage system. As stated above with respect to FIG. 2, the multi-rack object storage system 180 includes a plurality of interconnected racks 210, illustrated to include three racks 210.1-210.3. The multiple racks 210 are interconnected in a lateral or "east-west" arrangement using a switch illustrated as spine switch 218 for inter-rack communication between the top of rack (TOR) switches 215 of each rack 210. In operation, each access node may receive requests for object data from clients, create the metadata, which includes details about the object data locality, and forward the object data to the storage nodes. The storage nodes distribute the object data among a group of the storage nodes to provide high availability and durability of the object data.

Continuing an example operation, a client 160.1 selects an access node 220.1.1 and sends a request (GET/PUT) 710 directly to the access node 220.1.1. The access node 220.1.1 then checks metadata 551 (FIGS. 5 and 6) either local or remote to find the location of the requested object data. If the metadata designates the object data to be located in the same rack as the access node, then the access node sends the request to a storage node located in the same rack to retrieve the object data. Once the object data is returned, the access node forwards the object data to the requesting client.

When the metadata designates the metadata for the object data is located in a remote or different rack as illustrated in FIG. 7, then the access node 220.1.1 sends a request 720 for the metadata including the object data locality information to an access node 220.2.1 that contains the metadata for the requested object data. The requested metadata is then returned to the requesting access node 220.1.1. The access node 220.1.1 then reads the received metadata and determines from the object data locality details that the requested object data is located in yet a different remove rack 210.3. The requesting access node 220.1.1 then sends an object data request 730 to a storage node 230.3.1. The object data is then returned to the requesting access node 220.1.1 over the spine switch 218.

As noted, while the lateral exchange of requests, metadata, and responses may be acceptable due to the small amount of data being exchanged laterally within the distributed object storage system, the lateral transfer of the object data, for example, from storage node 230.3.1 in rack 210.3 to the access node 220.1.1 in rack 210.1 creates lateral congestion due to the size of the object data. Accordingly, the larger the object data traversing between the racks, the more impact to the available bandwidth within the multi-rack object storage system 180. Further, the lateral transfer of large object data may consume the total available bandwidth between the racks and create congestion or denial of service.

Figure 8:
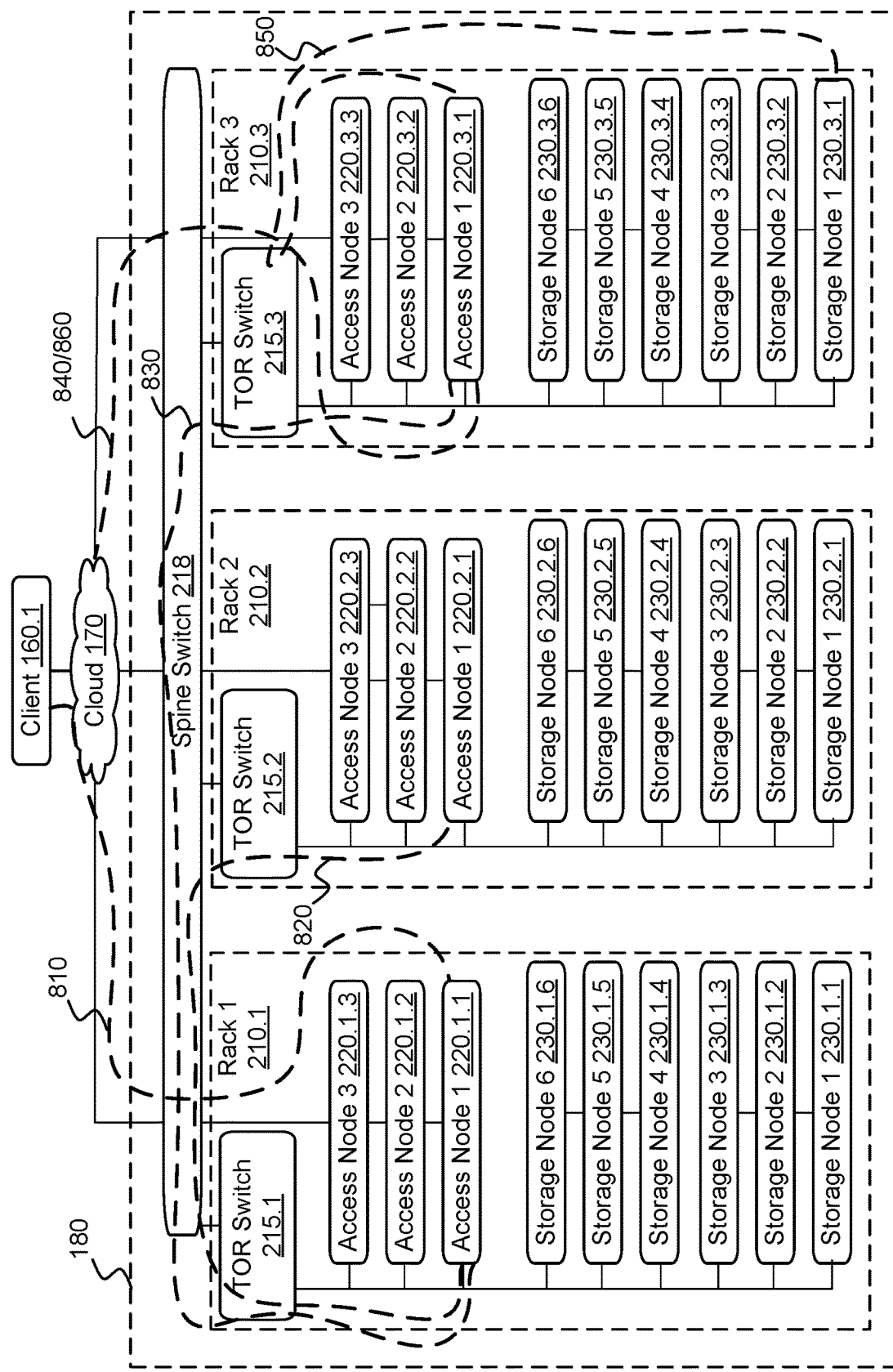
FIG. 8 illustrates a flow diagram of a connection relocation (e.g., migration) of a client request to a multi-rack distributed object storage system.

FIG. 8 illustrates a flow diagram of a connection relocation (e.g., migration) of a client request in a multi-rack distributed object storage system, in accordance with embodiments. To address the congestion identified in FIG. 7, disclosed embodiments provide a connection relocation (e.g., migration) method and system. As stated, inter-rack (e.g., east-west) congestion results from a received request occurring in a rack that does not include the requested object data.

Inter-rack congestion may be reduced by relocating the client request connection end point to the rack containing the requested object data. The embodiments herein utilize a connection-oriented protocol that allows for connection end point relocation.

One example of a connection-oriented protocol includes the QUIC protocol. QUIC is a transport layer network protocol with the definition of the standard available at QUIC: A UDP-Based Multiplexed and Secure Transport Draft-IETF-QUIC-Transport-08, a copy of which may be available at https://tools.ietf.org/html/draft-ietf-quic-transport-08. Generally, QUIC is a multiplexed and secure transport layer built atop UDP, and is designed and optimized for HTTP/2 semantics. QUIC provides multiplexing and flow control equivalent to HTTP/2, security equivalent to transport layer security (TLS), and connection semantics, reliability, and congestion control equivalent to TCP. Typically, TCP connections may be identified by a 4-tuple of source address, destination address and its ports. Accordingly using TCP, if a client's or server's IP address changes, then any active TCP connections are no longer valid. However, QUIC connections may be identified using, for example, a 64-bit connection ID. If the client's or server's IP address changes in a QUIC connection, the connection can continue to use the original connection ID for the new IP address without any requests.

An example operation of connection relocation (e.g., migration) is illustrated with respect to FIG. 8. Client 160.1 selects an access node 220.1.1 and sends a request (GET/PUT) 810 directly to the access node 220.1.1. The access node 220.1.1 then checks to determine if the metadata 551 (FIGS. 5 and 6) is local or remote, in order to ultimately determine the location of the requested object data. If the metadata designates the object data is located in the same rack as the access node that received the request from the client, then the access node sends the request to a storage node located in the local rack to retrieve the object data. Once the object data is returned, the access node forwards the object data to the requesting client.

When the metadata designates the metadata for the object data is located in a remote or different rack as illustrated in FIG. 8, then the access node 220.1.1 sends a request 820 for the metadata, which includes the object data locality details, to an access node 220.2.1 that contains the metadata for the requested object data. The requested metadata is then returned to the requesting access node 220.1.1. The access node 220.1.1 then reads the received metadata and determines from the object data locality details that the requested object data is located in storage node 230.3.1 in yet a different remote rack 210.3.

Unlike the operation described with respect to FIG. 7 where the request for the object data 730 is sent to the storage node 230.3.1, in the operation described in FIG. 8, the connection end point is relocated to the access node 220.3.1 located in remote rack 210.3. This is possible since, unlike a TCP connection, a connection based on a connection-oriented protocol, and example of which may be the QUIC transport protocol, is identified with a unique connection ID instead of the 4-tuples (source IP address, source port, destination IP address, destination port) of TCP.

Continuing the operation, the access node 220.1.1 sends a request 830 including the connection ID of the original connection to the access node 220.3.1 of the remote rack 210.3. The access node 220.3.1 then performs a handshake 840 with the client 160.1 using the connection ID and also send the new destination IP address of the access node 220.3.1 to be used in subsequent requests associated with the connection ID. The client then validates the received destination IP address and updates the parameters associated with the connection ID.

The access node 220.3.1 then returns the originally requested object data located in the storage node 230.3.1 directly to the client 160.1 without creating any lateral congestion in the multi-rack object storage system 180 as was identified with respect to the operations of FIG. 7.

Figure 9:
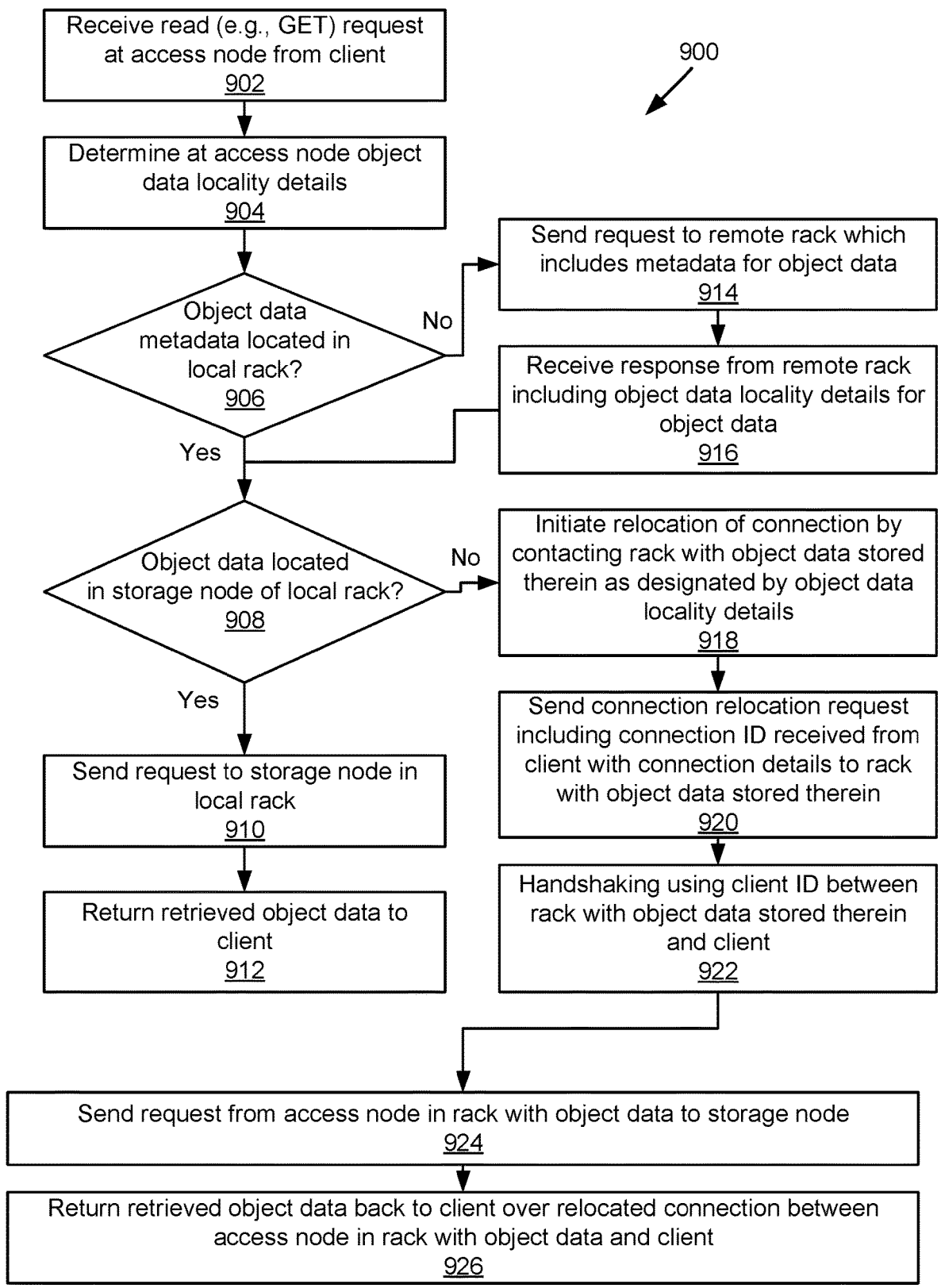
FIG. 9 illustrates a flow diagram for relocating a connection for a read request in a multi-rack object storage system.

FIG. 9 illustrates a flow diagram for relocating a connection for a read request (e.g., "GET") in a multi-rack object storage system, in accordance with embodiments. The multi-rack object storage system 180 may be operated according to a connection relocation (e.g., migration) method 900 illustrated by blocks 902-926 of FIG. 9. The client and the access nodes may be operated according to a connection-oriented protocol.

In block 902, a client-issued read request, such as a GET request, may be received by a first access node at a file interface. For example, a first request (flow 810 of FIG. 8) from a client for object data may be received over a connection between a client and a first access node in a first rack. The first request is for an object data, and the connection with the client is uniquely identified by a connection ID independent of source and destination addresses and ports. The first rack is part of a multi-rack distributed storage system.

In block 904, the first access node checks the locality of the object data by determining at the first access node object data locality details of the object data. If the one or more of the metadata and object data of the requested object data are not present in the first rack, then requests must be made to adjacent racks to determine the object data locality details.

In a first query block 906, a decision is made by the first access node regarding the locality of the metadata related to the requested object data in the first rack. When the first access node determines the metadata related to the requested object data to be within the first rack, then a second query block 908 determines whether the requested object data is also located in the first (local) rack. Responsive to the first access node determining that the requested object data is located in the local (e.g., "first") rack, then block 910 sends a request to the storage node within the first rack to retrieve the object data. In block 912, the first access node returns the requested object data over the connection to the client.

In the flow described above with respect to blocks 902-912, no connection relocation (e.g., migration) was utilized since the requested object data was resident within (e.g., local to) the rack that received the initial request from the client. Other embodiments that utilize connection relocation (e.g., migration) are described with respect to blocks 914-926.

In such embodiments, responsive to the first access node that receives the request from the client determining in the query block 906 that the metadata related to the requested object data is not resident within the first rack, then the first access node in block 914 sends a request (flow 820 of FIG.

8) to retrieve the metadata related to the requested object data to another rack (e.g., a second rack) within the multi-rack object storage system.

In block 916, a response including the requested metadata is generated by the second rack and sent to the requesting access node in the first rack. The query block 908 then determines based on the receive metadata whether the requested object data is located in (e.g., local to) the first rack. If the requested object data is located in the first rack, then processing continues as described above with respect to block 910 and block 912.

Responsive to the query block 908 determining from the received metadata that the requested object data is not located in the first rack, the first access node relocates the connection, in blocks 918-922, to the second access node in a second rack responsive to the object data locality details of the object data indicating that the object data is located within the second rack, wherein the first and second racks are included within the multi-rack distributed storage system. Specifically, the first access node in the first rack initiates relocation of the connection in block 918 by contacting the rack (e.g., a third rack, another rack, etc.) that contains the originally requested object data, as described, for example with respect to flow 830 of FIG. 8.

In block 920, the first access node in the first rack also sends (flow 830 of FIG. 8) the connection ID associated with the original connection from the client to an access node of the third rack. Specifically, the first access node in the first rack sends a second request to a remote access node in a remote rack within the multi-rack distributed storage system, wherein the remote access node includes metadata including the object data locality details of the object data. The first access node receives the object data locality details of the object data from the remote access node. The relocation of the connection may further include sending the first request from the client for the object data to the second access node in the second rack.

In block 922, the access node of the third rack engages in a handshake (flow 840 of FIG. 8) with the client using the connection ID as received from the access node of the first rack which originally engaged in the connection with the client. The access node of the third rack also shares its destination details (destination IP address, etc.) with the client to alter the address specifics associated with the connection ID. The client validates the newly received destination IP address and updates the address specifics associated with the connection ID and changes the destination IP address associated with the connection from a first IP address of the first access node in the first rack to a second IP address of the second access node in the second rack.

In block 924, the access node of the third rack requests (flow 850 of FIG. 8) the object data from the storage node in the third rack. In block 926, the access node of the third rack returns (flow 860 of FIG. 8) the object data as received from the storage node in the third rack to the client.

Accordingly, when the object data is not located in the same rack as the access node that originally received the request, the connection may be relocated to the rack containing the often much larger object data to allow the exchange of the object data to occur directly over a connection with the client.

Figure 10:
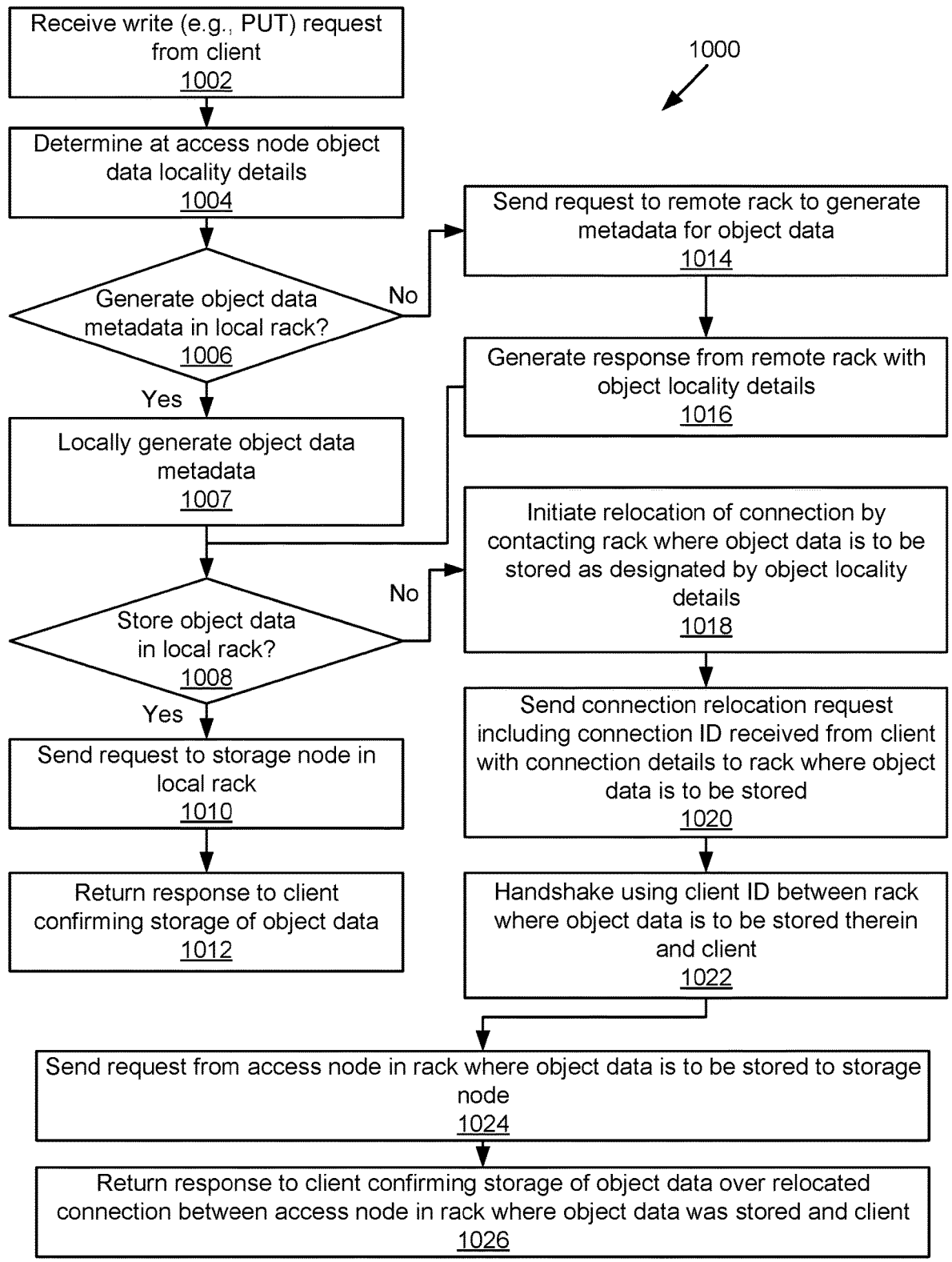
FIG. 10 illustrates a flow diagram for relocating a connection for a write request in a multi-rack object storage system.

FIG. 10 illustrates a flow diagram for relocating a connection for a write request (e.g., "PUT") in a multi-rack object storage system, in accordance with embodiments. The multi-rack object storage system 180 may be operated according to a connection relocation (e.g., migration) method 1000 illustrated by blocks 1002-1026 of FIG. 10. The client and the access nodes may be operated according to a connection-oriented protocol.

In block 1002, a client-issued request, such as a PUT request, may be received by an access node at a file interface. For example, a first request (flow 810 of FIG. 8) from a client for object data may be received over a connection at a first access node in a first rack. The first rack is part of a multi-rack distributed storage system.

In block 1004, the first access node determines (e.g., calculates or obtains) the locality of the object data by determining at the first access node object data locality details of the object data. In a first query block 1006, a decision is made by the first access node regarding whether the metadata should be store locally or remotely to the first rack. Responsive to the first access node determining that the metadata related to the object data should be located within the first rack, then block 1007 generates the metadata locally to the first rack.

A second query block 1008 determines whether the requested object data should be stored locally to the first rack. Responsive to the first access node determining that the requested object data should be stored locally in the first rack, then block 1010 sends a request to the storage node within the first rack to store the object data.

In block 1012, the first access node returns the response over the connection to the client signifying the successful storage of the object data.

In the flow described above with respect to blocks 1002-1012, no connection relocation (e.g., migration) was utilized since the requested storage of the object data was resident within the rack that received the initial request from the client. Other embodiments that utilize connection relocation (e.g., migration) are described with respect to blocks 1014-1026.

In such embodiments, when the first access node receiving the request from the client determines in the query block 1006 that the metadata related to the object data to be stored should not be resident within the first rack, then the first access node in block 1014 sends a request (flow 820 of FIG. 8) to generate the metadata related to the object data to another rack (e.g., a second rack) within the multi-rack object storage system.

In block 1016, a response including the object data locality details is generated by the second rack and sent to the requesting access node in the first rack.

The query block 1008 then determines whether the object data should be stored locally in the first rack. If the requested object data is stored in the first rack, then processing continues as described above with respect to block 1010 and block 1012. Responsive to the query block 1008 determining that the object data is not to be stored locally in the first rack, the first access node relocates the connection, in blocks 1018-1022, to the second access node in a second rack responsive to the object data locality details of the object data indicating that the object data is located within the second rack, wherein the first and second racks are included within the multi-rack distributed storage system. Specifically, the first access node in the first rack initiates in block 1018 relocation of the connection by contacting the rack that is to be used to store the object data, such as another rack, a third rack, etc., as described with reference to flow 830 of FIG. 8, for example.

In block 1020, the first access node in the first rack also sends (flow 830 of FIG. 8) the connection ID associated with the original connection from the client to an access node of the third rack. Specifically, the first access node in the first rack sends a second request to a remote access node in a remote rack within the multi-rack distributed storage system, wherein the remote access node includes metadata including the object data locality details of the object data. The first access node receives the object data locality details of the object data from the remote access node. The relocation of the connection may further include sending the first request from the client for the object data to the second access node in the second rack.

In block 1022, the access node of the third rack engages in a handshake (flow 840 of FIG. 8) with the client using the connection ID as received from the access node of the first rack which originally engaged in the connection with the client. The access node of the third rack also shares its destination details (destination IP address, etc.) with the client to alter the address specifics associated with the connection ID and changes the destination IP address associated with the connection from a first IP address of the first access node in the first rack to a second IP address of the second access node in the second rack.

In block 1024, the access node of the third rack receives (flow 850 of FIG. 8) the object data from the client and stores the object data in a storage node in the third rack. In block 1026, the access node of the third rack returns (flow 860 of FIG. 8) a response over the connection to the client signifying the successful storage of the object data in a storage node in the third rack.

Accordingly, when the object data is not located in the same rack as the access node that originally received the request, the connection may be relocated to the rack containing the often much larger object data to allow the exchange of the object data to occur directly over a connection with the client.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any suitable language.

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
   a first rack including a first access node; and
   a second rack including a second access node and a storage node,
   wherein:
     the first rack and the second rack are included within a multi-rack distributed storage system; and
     the first access node is configured to:
       receive, over a connection with a client, a first request for an object data, wherein:
         the connection with the client is uniquely identified by a connection identifier (ID) independent of source and destination addresses and ports; and
         the connection ID is associated with a first internet protocol (IP) address for the first access node;
       determine object data locality details of the object data; and
       relocate, responsive to the object data locality details of the object data indicating that the object data is located within the second rack, the connection to the second access node in the second rack, wherein the connection ID is associated with a second IP address for the second access node after relocation.

2. The system of claim 1, wherein the first rack includes metadata including the object data locality details for the object data.

3. The system of claim 1, wherein the first access node is further configured to determine the object data locality details by:
   sending a second request to a remote access node in a remote rack within the multi-rack distributed storage system, the remote access node including metadata including the object data locality details of the object data; and
   receiving the object data locality details of the object data from the remote access node.

4. The system of claim 3, wherein the remote rack and the second rack are a same rack within the multi-rack distributed storage system.

5. The system of claim 3, wherein the remote rack and the second rack are different racks within the multi-rack distributed storage system.

6. The system of claim 1, wherein the first access node is further configured to relocate the connection by sending the first request from the client for the object data to the second access node in the second rack.

7. The system of claim 6, wherein the first access node is further configured to relocate the connection by sending the connection ID to the second access node.

8. The system of claim 7, wherein the second access node is configured to:
   send the connection ID to the client; and
   send a destination address and a destination port of the second access node to the client.

9. The system of claim 8, wherein:
   the system further includes the client; and
   the client is configured to change a destination IP address associated with the connection ID from the first IP address of the first access node in the first rack to the second IP address of the second access node in the second rack.

10. The system of claim 1, wherein the second access node is configured to send a third request to the storage node in the second rack based on the object data locality details of the object data.

11. The system of claim 10, wherein the second access node is further configured to return the object data to the client responsive to the first request being a request to get the object data.

12. The system of claim 10, wherein the second access node is further configured to return a second response to the client responsive to the first request being a request to write the object data to the multi-rack distributed storage system.

13. The system of claim 1, wherein the connection is based on a Quick User datagram protocol (UDP) Internet Connection (QUIC) protocol.

14. A computer-implemented method, comprising:
   receiving, over a connection between a client and a first access node in a first rack, a first request for an object data, wherein:
     the connection with the client is uniquely identified by a connection identifier (ID) independent of source and destination addresses and ports; and
     the connection ID is associated with a first internet protocol (IP) address for the first access node;
   determining, at the first access node, object data locality details of the object data; and
   relocating, responsive to the object data locality details of the object data indicating that the object data is located within a second rack, the connection to a second access node in the second rack, wherein:
     the connection ID is associated with a second IP address for the second access node after relocation; and
     the first and second racks are included within a multi-rack distributed storage system.

15. The computer-implemented method of claim 14, wherein the first rack includes metadata including the object data locality details for the object data.

16. The computer-implemented method of claim 14, wherein determining the object data locality details further includes:
   sending a second request to a remote access node in a remote rack within the multi-rack distributed storage system, wherein the remote access node includes metadata including the object data locality details of the object data; and
   receiving the object data locality details of the object data from the remote access node.

17. The computer-implemented method of claim 14, wherein relocating the connection further includes sending the first request from the client for the object data to the second access node in the second rack.

18. The computer-implemented method of claim 14, further comprising sending a third request to a storage node in the second rack based on the object data locality details of the object data.

19. The computer-implemented method of claim 14, wherein the connection is based on a Quick User datagram protocol (UDP) Internet Connection (QUIC) protocol.

20. A system, comprising:
- means for receiving, over a connection between a client and a first access node in a first rack, a first request for an object data, wherein:
  - the connection with the client is uniquely identified by a connection identifier (ID) independent of source and destination addresses and ports; and
  - the connection ID is associated with a first internet protocol (IP) address for the first access node;
- means for determining, at the first access node, object data locality details of the object data; and
- means for relocating, responsive to the object data locality details of the object data indicating that the object data is located within a second rack, the connection to a second access node in the second rack, wherein:
  - the connection ID is associated with a second IP address for the second access node after relocation; and
  - the first and second racks are included within a multi-rack distributed storage system.

\* \* \* \* \*